United States Patent
Hayashi

(10) Patent No.: US 10,002,314 B2
(45) Date of Patent: Jun. 19, 2018

(54) INFORMATION PROCESSING APPARATUS FOR EFFICIENTLY ISSUING A PRINT INSTRUCTION TO IMAGE FORMING APPARATUS AND METHOD FOR CONTROLLING THE SAME

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 14/816,698

(22) Filed: Aug. 3, 2015

(65) Prior Publication Data
US 2016/0041795 A1 Feb. 11, 2016

(30) Foreign Application Priority Data
Aug. 6, 2014 (JP) ................... 2014-160673

(51) Int. Cl.
*G06K 15/02* (2006.01)
*G06F 3/12* (2006.01)

(52) U.S. Cl.
CPC ....... *G06K 15/1806* (2013.01); *G06F 3/1205* (2013.01); *G06F 3/1257* (2013.01); *G06F 3/1275* (2013.01); *G06F 3/1285* (2013.01)

(58) Field of Classification Search
CPC .. G06F 3/1205; G06F 3/1275; G06K 15/1806
USPC .................. 358/1.13, 1.9; 717/110
See application file for complete search history.

(56) References Cited

U.S. PATENT DOCUMENTS

2006/0023244 A1* 2/2006 Mitsui ............... G06F 3/1205
                                                                      358/1.13
2011/0279847 A1   11/2011 Kakoi

FOREIGN PATENT DOCUMENTS

| CN | 102200896 A | 9/2011 |
|----|-------------|--------|
| CN | 102736872 A | 10/2012 |
| JP | H08-161130 A | 6/1996 |
| JP | 2006-285870 A | 10/2006 |
| JP | 2012-078999 A | 4/2012 |

* cited by examiner

*Primary Examiner* — Jamares Q Washington
(74) *Attorney, Agent, or Firm* — Canon U.S.A. Inc., IP Division

(57) ABSTRACT

An information processing apparatus acquires a job ticket in which print settings are described, reflects the print settings described in the job ticket to a public portion of the settings of the printer driver stored in a storage portion, and issues a print execution instruction to the printer driver to generate a PDL. Then, the information processing apparatus edits print settings of the generated PDL based on the print setting described in the job ticket, and transmits the edited PDL to an image forming apparatus.

5 Claims, 21 Drawing Sheets

FIG. 4

```
                    WORKFLOW APPLICATION  — 200
                            │
                            ▼
  ┌─────────────────────────────────────────────────────────────────┐
  │ PRINTING CONTROL MODULE — 202                                    │
  │  ┌────────────────────────────────────────────────────────────┐ │
  │  │ PRINTING CONTROL UNIT — 400                                │ │
  │  │                                                            │ │
  │  │  401      402       403        404         405             │ │
  │  │ ACQUI-  SELECTION  GENERATION  EDITING   TRANSMISSION       │ │
  │  │ SITION   UNIT       UNIT       UNIT        UNIT            │ │
  │  │  UNIT                                                      │ │
  │  └────────────────────────────────────────────────────────────┘ │
  │      ▲         ▲          ▲                                      │
  │      │         │          │                                      │
  │   DEVMODE   204       206                                        │
  │  DATABASE  PRINTER  PRINTER                                      │
  │    203    DRIVER   DRIVER                                        │
  └─────────────────────────────────────────────────────────────────┘
                   │          │              │          │
                   ▼          ▼              ▼          ▼
                PRINT       PRINT
               SPOOLER     SPOOLER
                205         207
                  │           │
                  ▼           ▼
               IMAGE        IMAGE
              FORMING      FORMING
             APPARATUS    APPARATUS
                102          103
```

FIG. 7

PRINT SETTINGS OF PRINTER DRIVER FOR IMAGE FORMING APPARATUS 102 ☒ — 700

PAPER

| | | |
|---|---|---|
| SIZE | A4 ▽ | — 701 |
| COLOR | WHITE ▽ | — 702 |
| TYPE | PLAIN PAPER ▽ | — 703 |
| GRAMMAGE | 80 gsm ▽ | — 704 |

ONE/TWO-SIDED PRINTING [ ONE-SIDED PRINTING ▽ ] — 705
NUMBER OF COPIES [ 1 ] — 706

FINISHING

STAPLING [ NONE ▽ ] — 707

[ OK ] [ CANCEL ] [ APPLY ]

PRINT SETTINGS OF PRINTER DRIVER FOR IMAGE FORMING APPARATUS 103 ☒ — 708

PAPER

| | | |
|---|---|---|
| SIZE | A4 ▽ | — 709 |
| COLOR | WHITE ▽ | — 710 |
| TYPE | PLAIN PAPER ▽ | — 711 |
| GRAMMAGE | 80 gsm ▽ | — 712 |

ONE/TWO-SIDED PRINTING [ ONE-SIDED PRINTING ▽ ] — 713
NUMBER OF COPIES [ 1 ] — 714

FINISHING

STAPLING [ NONE ▽ ] — 715
BOOKBINDING [ TAPE BOOKBINDING ▽ ] — 716
FOLDING [ NONE ▽ ] — 717

[ OK ] [ CANCEL ] [ APPLY ]

FIG. 8

508
DEVMODE
- PAPER SIZE:A4 — 807
- PAPER TYPE:PLAIN PAPER — 808
- ONE/TWO-SIDED PRINTING: ONE-SIDED PRINTING — 809
- NUMBER OF COPIES:1 — 810
- ...

(PUBLIC PORTION)

- PAPER COLOR:WHITE — 811
- PAPER GRAMMAGE:80 — 812
- STAPLING SETTING:NONE — 813
- BOOKBINDING: TAPE BOOKBINDING — 813
- FOLDING SETTING:NONE — 813
- ...

(PRIVATE PORTION)

504
DEVMODE
- PAPER SIZE:A4 — 800
- PAPER TYPE:PLAIN PAPER — 801
- ONE/TWO-SIDED PRINTING: ONE-SIDED PRINTING — 802
- NUMBER OF COPIES:1 — 803
- ...

(PUBLIC PORTION)

- PAPER COLOR:WHITE — 804
- PAPER GRAMMAGE:80 — 805
- STAPLING SETTING:NONE — 806
- ...

(PRIVATE PORTION)

FIG. 9

```
900
<JDF DescriptiveName="Sample1">
    <ResourcePool>
        <Media
            Dimension="595 842"           901
            MediaTypeDetails="Stationary"  902
903 ─── MediaColorName="Yellow"
904 ─── Weight="64" />
        <LayoutPreparationParams           905
            Sides="OneSidedFront"/>
        <FileSpec URL="../TEST.pdf"/>      906
    </ResourcePool>
    <ResourceLinkPool>
        <ComponentLink Amount="25000"/>    907
    </ResourceLinkPool>
</JDF>
```

```
908
<JDF DescriptiveName="Sample2">
    <ResourcePool>
        <Media
            Dimension="595 842"           909
            MediaTypeDetails="Stationary" 910
911 ─── MediaColorName="White"
912 ─── Weight="75" />
        <LayoutPreparationParams           913
            Sides="TwoSidedFlipY"/>
914 ─── <SpineTapingParams/>
        <GeneralID
            IDUsage="QueueInfo"            915
            IDValue="HOLD"/>               916
        <FileSpec URL="../TEST.pdf"/>
    </ResourcePool>
    <ResourceLinkPool>
        <ComponentLink Amount="500"/>      917
    </ResourceLinkPool>
</JDF>
```

FIG. 10

```
<?xml version="1.0" encoding="UTF-8"?>
<DevmodeDatas>                                                          1000
  <DevmodeDataArray>
    <DevmodeData FileName="DEVMODE504">
      <Rules>
        <Rule
          Key="/JDF/ResourcePool/Media[@Dimension='595 842']"            1001
          Exist="TRUE"/>                                                 1002
        <Rule
          Key="/JDF/ResourcePool/SpineTapingParams"                      1003
          Exist="FALSE"/>                                                1004
      </Rules>                                                           1005
    </DevmodeData>
    <DevmodeData FileName="DEVMODE508">
      <Rules>
        <Rule
          Key="/JDF/ResourcePool/Media[@Dimension='595 842']"            1006
          Exist="TRUE"/>                                                 1007
        <Rule
          Key="/JDF/ResourcePool/SpineTapingParams"                      1008
          Exist="TRUE"/>                                                 1009
      </Rules>
    </DevmodeData>
  </DevmodeDataArray>
</DevmodeDatas>
```

503

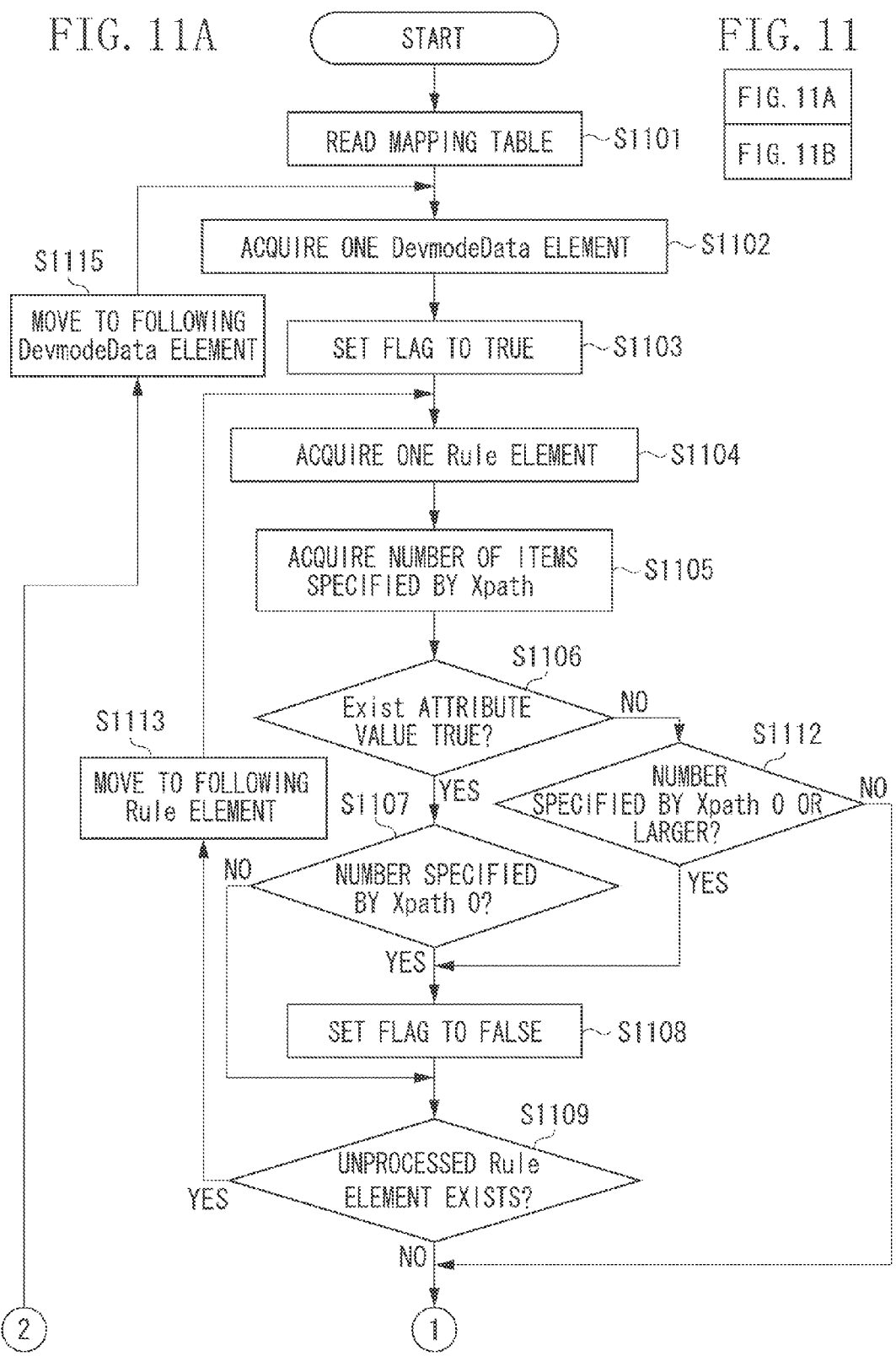

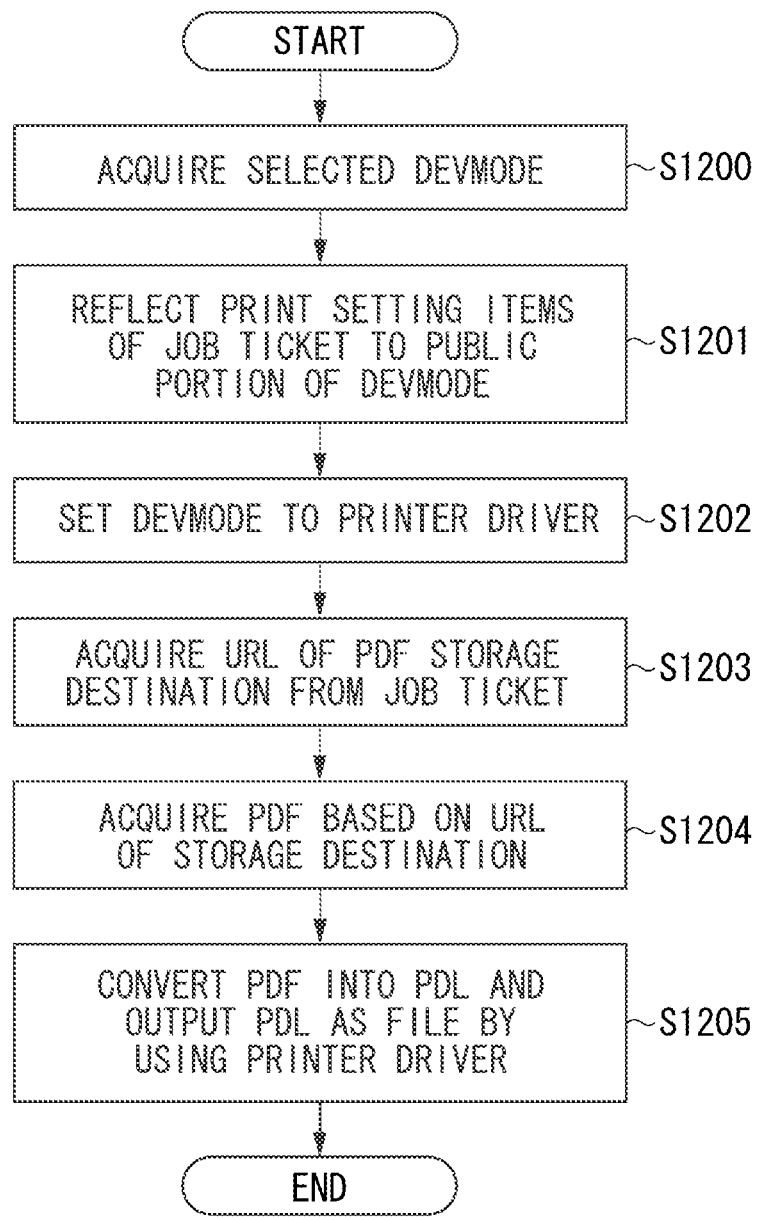

RESOURCE PORTION:
- 1301: %%BeginFeature: *NumCopies 1
  %%EndFeature
- 1302: %%BeginFeature: *Duplex None
  %%EndFeature
- 1303: %%BeginFeature: *MediaWeight 80gsm
  %%EndFeature
- 1304: %%BeginFeature: *MediaColorWhite
  %%EndFeature

1305

CUSTOM JOB TICKET:
- 1306: `<?xml version="1.0" encoding="utf-8"?>`
- `<jt>`
- 1307: `<job-template>`
- 1308: `<copies type="integer">500</copies>`
- 1309: `<media-color type="keyword">white</media-color>`
- 1310: `<media-weight type="integer">80</media-weight>`
- 1311: `<finishing type="keyword">tape-binding</finishing>`
- 1316: `<sides type="keyword">one-sided</sides>`
- `<job-name type="name">test</job-name>`
- `</job-template>`
- `</jt>`

RESOURCE PORTION:
- 1312: %%BeginFeature: *NumCopies 1
  %%EndFeature
- 1313: %%BeginFeature: *Duplex None
  %%EndFeature
- 1314: %%BeginFeature: *MediaWeight 80gsm
  %%EndFeature
- 1315: %%BeginFeature: *MediaColorWhite
  %%EndFeature

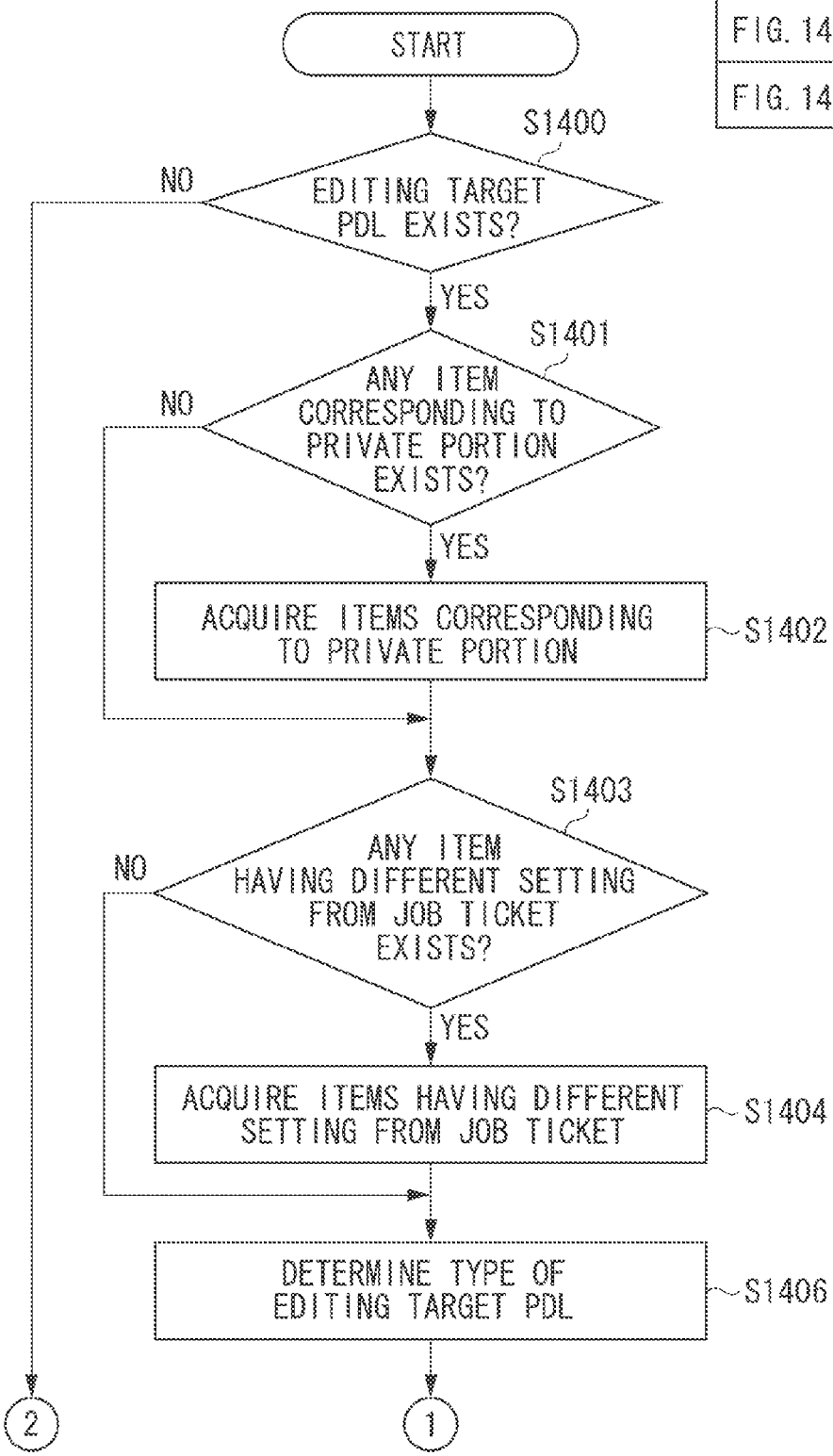

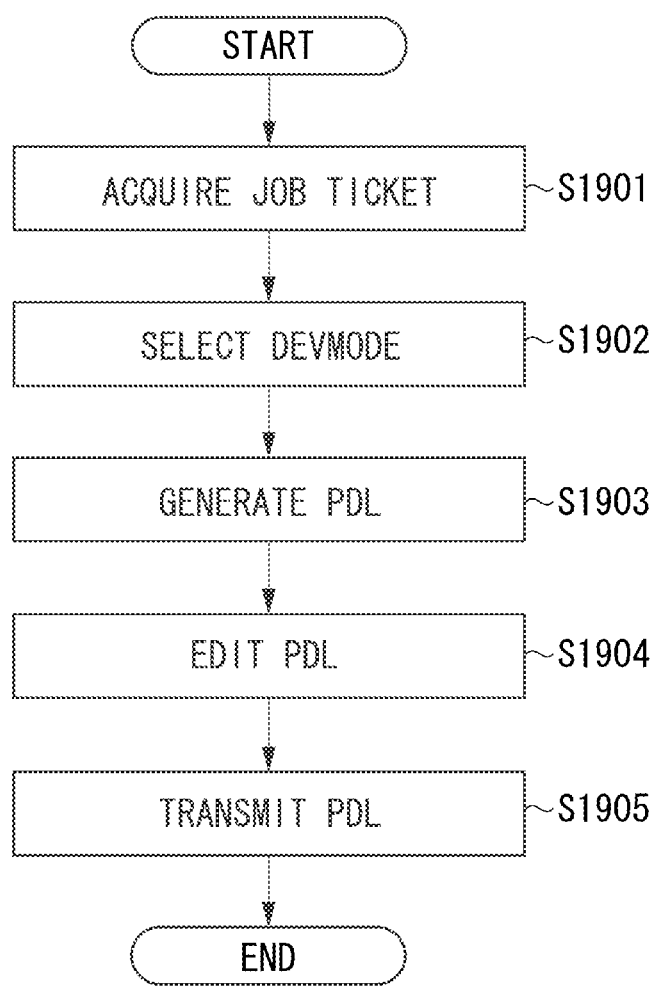

INFORMATION PROCESSING APPARATUS FOR EFFICIENTLY ISSUING A PRINT INSTRUCTION TO IMAGE FORMING APPARATUS AND METHOD FOR CONTROLLING THE SAME

BACKGROUND OF THE INVENTION

Field of the Invention

The present invention relates to a print instruction for instructing an image forming apparatus to perform printing.

Description of the Related Art

A plurality of image forming apparatuses is used on a print production site where print materials such as fliers and reports are produced and tape bookbinding is performed, as in the case of in-house printing. There is a case where image forming apparatuses of a plurality of vendors exist together on the production site. When a workflow application is introduced into such a production site, it is desirable that a user can issue a print instruction to a plurality of image forming apparatuses via the workflow application. More specifically, it is desirable that the user can issue a print instruction to in-house and other companies' image forming apparatuses via one workflow application.

However, the user cannot issue a print instruction to other companies' image forming apparatuses via a workflow application because job ticket specifications of these image forming apparatuses are not disclosed. Each time printing is performed, the user may open a printer driver applicable to a transmission destination image forming apparatus, set print setting items, and issue a print instruction to the image forming apparatus. However, when there are many orders, it is not efficient to open a printer driver each time printing is performed. Further, a certain technique can automatically acquire a printer driver applicable to an image forming apparatus selected as a print data output destination and perform printing (Japanese Patent Application Laid-Open No. 8-161130).

However, the technique discussed in Japanese Patent Application Laid-Open No. 8-161130 is effective only for print settings of which specifications are disclosed. Accordingly, default values of the printer driver remain unchanged for print settings of which specifications are not disclosed.

SUMMARY OF THE INVENTION

The present invention is directed to a technique for enabling efficiently issuing a print instruction to image forming apparatuses whose job ticket specifications are not disclosed.

According to an aspect of the present invention, an information processing apparatus includes a storage unit configured to store settings of a printer driver, an acquisition unit configured to acquire a job ticket in which print settings are described, a generation unit configured to reflect the print settings described in the job ticket to a public portion of the stored settings of the printer driver to generate a Page Description Language (PDL) by using the printer driver, an editing unit configured to edit print settings of the generated PDL based on the print settings described in the job ticket, and a transmission unit configured to transmit the edited PDL to an image forming apparatus.

Further features of the present invention will become apparent from the following description of exemplary embodiments with reference to the attached drawings.

BRIEF DESCRIPTION OF THE DRAWINGS

FIG. 4 illustrates a software configuration of a printing control module according to the present exemplary embodiment.

FIG. 7 illustrates print setting screens for printer drivers according to the present exemplary embodiment.

FIG. 8 illustrates examples of DEVMODEs according to the present exemplary embodiment.

FIG. 9 illustrates examples of job tickets according to the present exemplary embodiment.

FIG. 10 illustrates an example of a mapping table according to the present exemplary embodiment.

FIG. 11, which includes FIGS. 11A and 11B, is a flowchart illustrating a DEVMODE selection processing flow according to the present exemplary embodiment.

FIG. 12 is a flowchart illustrating a Page Description Language (PDL) generation processing flow according to the present exemplary embodiment.

FIG. 13 illustrates examples of PDLs according to the present exemplary embodiment.

FIG. 14, which includes FIGS. 14A and 14B, is a flowchart illustrating a PDL editing processing flow according to the present exemplary embodiment.

FIG. 19 is a flowchart illustrating processing of the management server according to the present exemplary embodiment.

DESCRIPTION OF THE EMBODIMENTS

Exemplary embodiments of the present invention will be described below with reference to the accompanied drawings.

Figure 1:
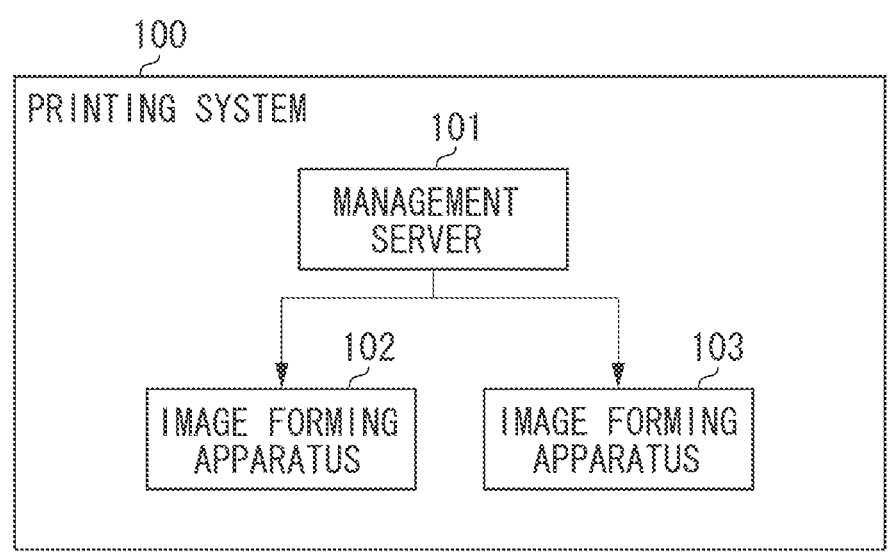
FIG. 1 illustrates a network configuration for information processing apparatuses according to the present exemplary embodiment.

FIG. 1 illustrates a network configuration for information processing apparatuses according to the present exemplary embodiment. Referring to FIG. 1, a printing system 100 receives an order for producing a print material and produces the print material. The printing system 100 includes a management server 101 for managing orders, and an image forming apparatus 102 and an image forming apparatus 103 for printing and processing print materials.

The management server 101 is an information processing apparatus for managing and storing an order. According to an instruction from a user of the printing system 100, the management server 101 generates a job corresponding to the order and then transmits the generated job to the image forming apparatus 102 or the image forming apparatus 103.

According to the present exemplary embodiment, the image forming apparatuses 102 and 103 each are made by different vendors. Further, the image forming apparatuses 102 and 103 each have different capabilities. According to the present exemplary embodiment, the image forming apparatus 102 can perform only monochrome printing, and the image forming apparatus 103 can perform not only monochrome printing but also tape bookbinding on an in-line basis.

Figure 2:
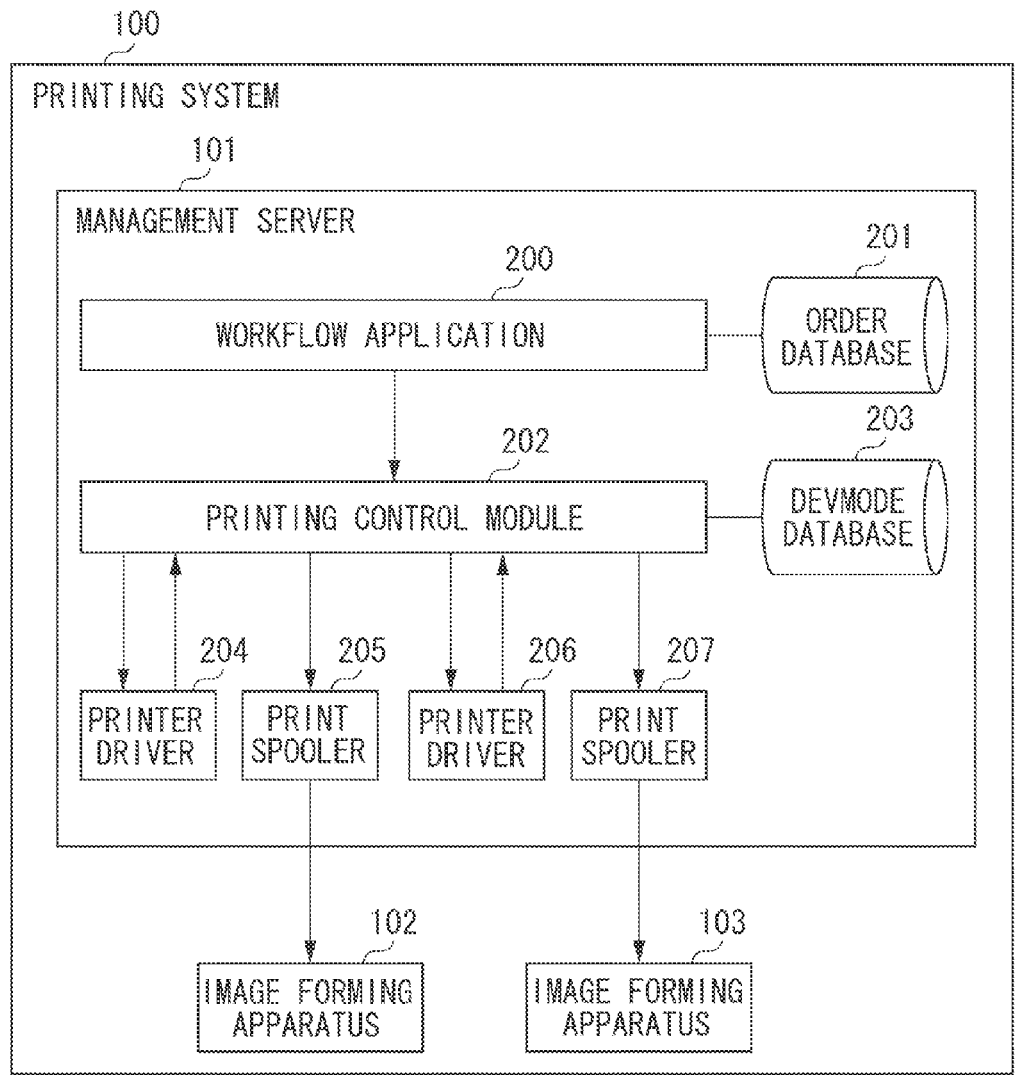
FIG. 2 illustrates a configuration of a management server according to the present exemplary embodiment.

FIG. 2 illustrates a configuration of the management server 101 according to the present exemplary embodiment. Referring to FIG. 2, a workflow application 200 has functions of registering an order, generating a print job based on information of the order registered in a workflow application 200, determining an image forming apparatus which is a transmission destination of the print job, and transmitting the print job.

A print job includes a job ticket and contents. The job ticket may be made out, for example, in the Job Definition Format (JDF) formulated by the Cooperation for Integration of Processes in Prepress, Press, and Postpress (CIP4), which is a standard-setting organization. The job ticket may also be in an original format. The content may be, for example, in the Portable Document Format (PDF) of Adobe. The content may be a PDL such as PostScript of Adobe, a PDL originally developed by each printer maker, or a graphics file. The formats of the job ticket and the content do not restrain the present invention. According to the present exemplary embodiment, the JDF is used for the job ticket and the PDF is used for the content.

An order database 201 stores data required for operations of the workflow applications 200, such as orders and print jobs registered in the workflow application 200 and a list of image forming apparatuses which are transmission destinations of the orders. For example, at the time of print job transmission, the workflow application 200 acquires a print job (job ticket) from the order database 201. Then, the workflow application 200 acquires the identifier of the transmission destination image forming apparatus from the order database 201 and then transfers the job ticket and the identifier of the image forming apparatus to a printing control module 202 (described below).

The printing control module 202 is a program which operates in response to an instruction from the workflow application 200, and has functions of transmitting a print job to an image forming apparatus, acquiring a status of the print job, and acquiring a status of the image forming apparatus. For example, when the workflow application 200 transmits a print job, the workflow application 200 transfers to the printing control module 202 the job ticket of the print job and the identifier of a transmission destination image forming apparatus. The printing control module 202 receives the job ticket and the identifier of the image forming apparatus and then performs print job transmission processing (described below).

A DEVMODE database 203 is a place (storage portion) for storing DEVMODEs of Microsoft Corporation for storing various settings for printer drivers. According to the present exemplary embodiment, DEVMODEs are stored in the DEVMODE database 203 as binary files. Mapping tables (described below) are also stored in the DEVMODE database 203. The DEVMODE database 203 may be either a folder or a program such as a Structured Query Language (SQL) database. According to the present exemplary embodiment, since DEVMODEs just need to be stored, DEVMODEs are stored in the DEVMODE database 203 by using folders. The folder configuration of the DEVMODE database 203 will be described below. A DEVMODE includes two areas: a public portion, specifications of which are disclosed, and a private portion, specifications of which are not disclosed. The private portion can be accessed only by a printer driver. While, according to the present exemplary embodiment, an example of using a DEVMODE will be described, a DEVMODE may not be used as long as a file for printing or bookbinding is used.

A printer driver 204 and a print spooler 205 are a driver and a spooler applicable to the image forming apparatus 102, respectively. A printer driver 206 and a print spooler 207 are a driver and a spooler applicable to the image forming apparatus 103, respectively.

Figure 3:
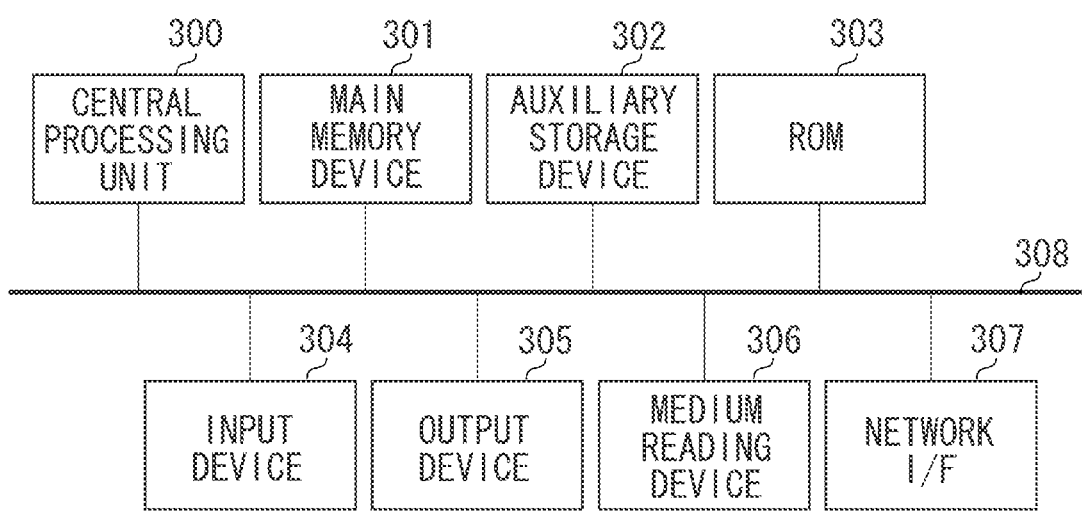
FIG. 3 illustrates a hardware configuration of the management server according to the present exemplary embodiment.

FIG. 3 is a block diagram illustrating a hardware configuration of the management server 101 according to the present exemplary embodiment. Referring to FIG. 3, a central processing unit (CPU) 300 reads a program and related data such as the workflow application 200 and the order database 201 from a storage medium storing the program and data via a medium reading device 306 connected to the printing system 100. Alternatively, the CPU 300 may receive a program and data via a network interface (I/F) 307 and store the program and data in an auxiliary storage device 302 such as a hard disk. Then, the CPU 300 executes an application program loaded from the auxiliary storage device 302 into a main memory device 301, processes information input from an input device 304, and outputs the processed information to the image forming apparatuses 102 and 103 via an output device 305 and the network I/F 307. According to the present exemplary embodiment, the output device 305 is a display apparatus and is distinguished from the image forming apparatuses 102 and 103 which are originally categorized as output devices. Moreover, the input device 304 includes a keyboard and a pointing device. A system bus 308 is a path for data transfer between the above-described components.

Procedures illustrated in the flowcharts (described below) are stored in any one of the main memory device 301, an auxiliary storage device 302, and a read only memory (ROM) 303 of the management server 101. Regularly, the procedures are copied in the main memory device 301 and then executed by the CPU 300.

The auxiliary storage device 302 may include a hard disk, a magneto-optical disk, or a combination of both. Even if each device is connected via a network, the connection configuration does not restrict the present invention.

FIG. 4 illustrates a software configuration of the printing control module 202 according to the present exemplary embodiment. FIG. 4 illustrates features of processing according to the present exemplary embodiment.

Referring to FIG. 4, a printing control unit 400 receives a job ticket and the identifier of an image forming apparatus from the workflow application 200 and then controls processing related to printing.

An acquisition unit 401 acquires the job ticket received by the printing control unit 400 and then returns the information in the job ticket according to an instruction from the printing control unit 400. The acquisition unit 401 also acquires the identifier of an image forming apparatus which will perform printing.

A selection unit 402 selects one of DEVMODEs applicable to print setting items described in the job ticket from among DEVMODEs prepared for printer drivers. The DEVMODEs are applicable to the image forming apparatus specified in the identifier of the image forming apparatus.

A generation unit 403 generates a PDL. More specifically, the generation unit 403 issues a print instruction to a printer driver applicable to the image forming apparatus specified by the identifier of the image forming apparatus, causing the printer driver to generate a PDL, and stores the generated PDL as a file in a predetermined location.

An editing unit 404 edits the PDL. More specifically, the editing unit 404 acquires the PDL generated and stored by the generation unit 403, edits the PDL into another PDL based on print setting items in the job ticket, and stores the edited PDL as a file in a predetermined location.

A transmission unit 405 transmits the PDL. More specifically, the transmission unit 405 converts the edited PDL stored by the editing unit 404 into binary data and then transmits the resultant data to a print spooler. The print spooler transmits the binary data to the image forming apparatus. When an instruction for transmitting binary data to a specific queue is described in the job ticket, the transmission unit 405 changes the queue name of the transmission port and then transmits the binary data to the print spooler. According to the present exemplary embodiment, a print spooler is used. However, since a print job only needs to be transmitted to the image forming apparatus, the transmission unit 405 may use, for example, the Line PRinter (LPR) protocol or the RAW protocol. The transmission protocol does not restrict the present invention.

FIG. 19 is a flowchart illustrating processing of the management server 101.

In step S1901, the acquisition unit 401 acquires a job ticket and the identifier of an image forming apparatus which performs printing. In step S1902, the selection unit 402 selects one of DEVMODEs applicable to print setting items described in the job ticket. In step S1903, the generation unit 403 issues a print instruction to a printer driver applicable to the image forming apparatus specified in the identifier of the image forming apparatus to generate a PDL by using the printer driver. In step S1904, the editing unit 404 edits the generated PDL based on print setting items described in the job ticket. In step S1905, the transmission unit 405 converts the edited PDL into binary data and then transmits the binary data to the image forming apparatus.

Figure 5:
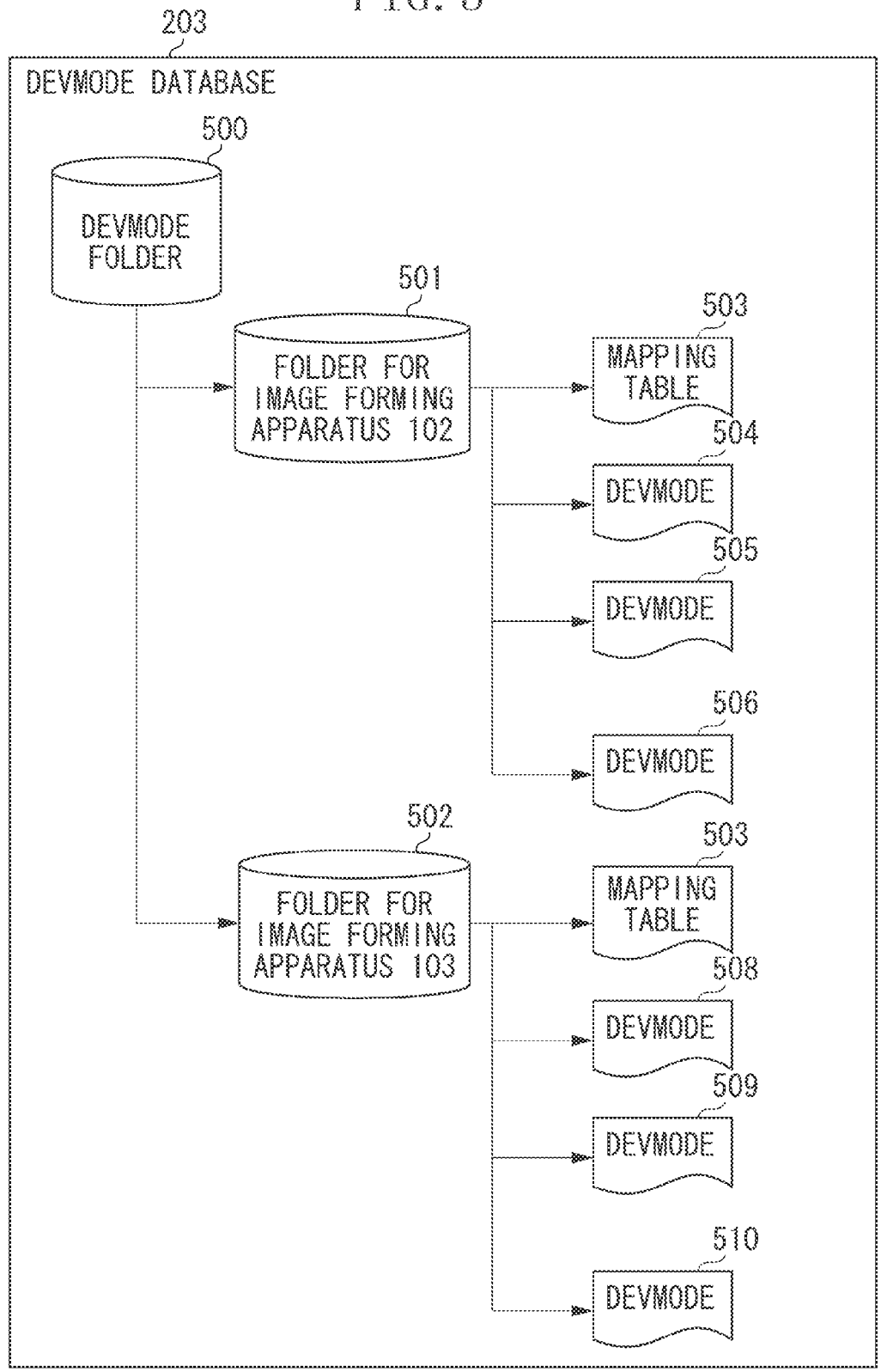
FIG. 5 illustrates a configuration of a print setting database according to the present exemplary embodiment.

FIG. 5 illustrates a configuration of the DEVMODE database 203 according to the present exemplary embodiment. Referring to FIG. 5, the DEVMODE database 203 has a folder configuration in which a DEVMODE folder 500 is the highest folder. Subfolders of the DEVMODE folder 500 are prepared for individual image forming apparatuses. More specifically, subfolders of the DEVMODE folder 500 include a folder for the image forming apparatus 102 and a folder for the image forming apparatus 103. The name of each folder coincides with the identifier of each image forming apparatus. The folder for the image forming apparatus 102 and the folder for the image forming apparatus 103 each stores a mapping table and DEVMODEs. For example, the folder for the image forming apparatus 102 stores a mapping table 503 and DEVMODEs 504 to 506. According to the present exemplary embodiment, only one mapping table 503 is prepared in each of the folder for the image forming apparatus 102 and the folder for the image forming apparatus 103. However, in a case where only one mapping table is prepared, the only one mapping table may be stored in a different storage location. Additionally, when DEVMODEs prepared for the image forming apparatus 102 are largely different from DEVMODEs prepared for the image forming apparatus 103, it is desirable to prepare a mapping table separately for each image forming apparatus.

Figure 6:
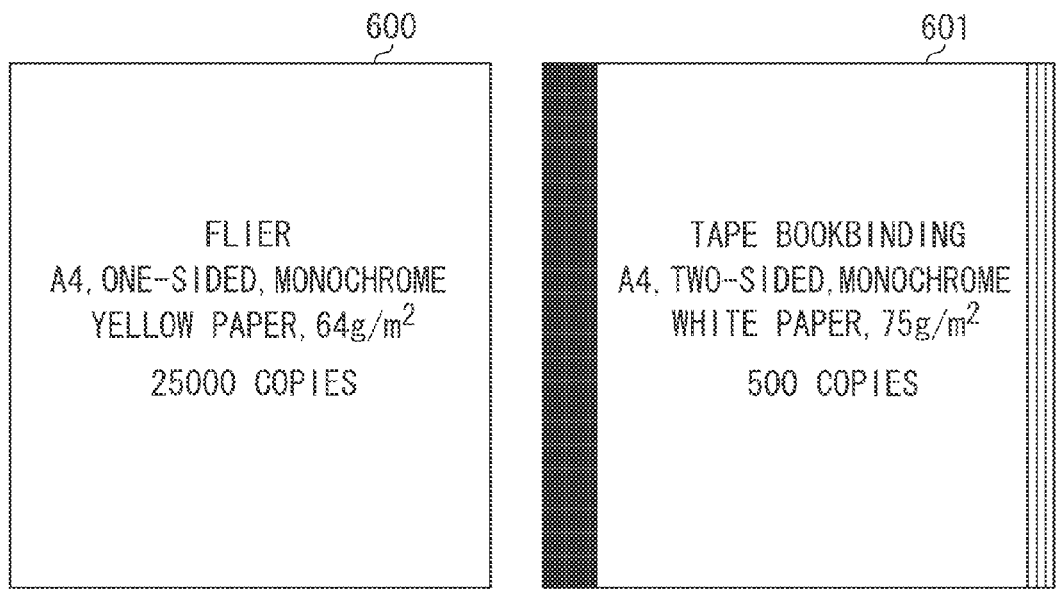
FIG. 6 illustrates examples of print materials according to the present exemplary embodiment.

FIG. 6 illustrates examples of print materials according to the present exemplary embodiment. Referring to FIG. 6, the type of a print material 600 is a flier. Print setting items required to print the print material 600 include a paper size of A4, one-sided printing as one/two-sided printing setting, yellow paper as output paper, and an output paper grammage of 64 g/m2. The type of a print material 601 is tape bookbinding. Print setting items required to print the print material 601 include a paper size of A4, a two-sided printing as setting of one/two-sided printing setting, a long-side binding setting, white paper as an output paper, and an output paper grammage of 75 g/m2. In the present exemplary embodiment, the print material 600 is printed by the image forming apparatus 102 and the print material 601 is printed by the image forming apparatus 103.

FIG. 7 illustrates print setting screens for printer drivers according to the present exemplary embodiment. Referring to FIG. 7, a print setting screen 700 displays print setting items for the image forming apparatus 102. More specifically, the print setting screen 700 displays a paper size 701, a paper color 702, a paper type 703, a paper grammage 704, a one/two-sided printing setting 705, the number of copies 706, and a stapling setting 707. A print setting screen 708 displays print setting items for the image forming apparatus 103. More specifically, the print setting screen 708 displays a paper size 709, a paper color 710, a paper type 711, a paper grammage 712, a one/two-sided printing setting 713, the number of copies 714, a stapling setting 715, a bookbinding setting 716, and a folding setting 717.

According to the present exemplary embodiment, the DEVMODE 504 stores the print setting items set in the print setting screen 700 illustrated in FIG. 7, and a DEVMODE 508 stores the print setting items set in the print setting screen 708 illustrated in FIG. 7.

In a printing task in which available order items are predetermined, as in the case of in-house printing, print setting items for a printer driver can be stored as a DEVMODE as described above. In the in-house printing, a template of a printing request form is predetermined, and print setting items which can be input by using the template are limited. For example, in a case where print setting items such as the color/monochrome printing setting, the one/two-sided printing setting, the paper size, and the tape bookbinding ON/OFF setting are defined as a template of a printing request form, a production site may receive an order combining the above-described print setting items. Therefore, print setting items required to produce products available for order can be stored as a DEVMODE.

FIG. 8 illustrates examples of DEVMODEs according to the present exemplary embodiment. Referring to FIG. 8, the DEVMODE 504 includes the print setting items set in the print setting screen 700 illustrated in FIG. 7. The public portion includes a paper size 800, a paper type 801, a two-sided printing setting 802, and the number of copies 803. The specifications of the public portion are disclosed. The private portion, which can be accessed only by the printer driver, includes a paper color 804, a paper grammage 805, and a stapling setting 806. In the print setting screen 700 (for the printer driver of the image forming apparatus 102) illustrated in FIG. 7, when the paper size 701 is changed from A4 to A3, the value of the paper size 800 illustrated in FIG. 8 is accordingly changed.

The DEVMODE 508 includes the print setting items set in the print setting screen 708 illustrated in FIG. 7. Similar to the DEVMODE 504, the DEVMODE 508 contains the public portion and the private portion. The public portion includes a paper size 807, a paper type 808, and a one/two-sided printing setting 809, and the number of copies 810, and the private portion includes a paper color 811, a paper grammage 812, and a stapling setting 813.

FIG. 9 illustrates examples of job tickets according to the present exemplary embodiment. Referring to FIG. 9, a job ticket 900 defines print setting items required to print the print material 600. More specifically, the job ticket 900 defines a paper size 901, a paper type 902, a paper color 903, a paper grammage 904, a one/two-sided printing setting 905, a file path 906 up to PDF, and the number of copies 907. A job ticket 908 defines print setting items required to print the print material 601. More specifically, the job ticket 908 defines a paper size 909, a paper type 910, a paper color 911, a paper grammage 912, a one/two-sided printing setting 913, a tape bookbinding setting 914, a queue name 915 registered in the image forming apparatus 103, a file path 916 up to PDF, and the number of copies 917.

The job tickets 900 and 908 are generated by the workflow application 200. The workflow application 200 transfers the job ticket 900, the identifier of the image forming apparatus 102, the job ticket 908, and the identifier of the image forming apparatus 103 to the printing control module 202 at the timing of print job transmission.

FIG. 10 illustrates an example of a mapping table according to the present exemplary embodiment. Referring to FIG. 10, the mapping table 503 is prepared to enable the selection unit 402 of the printing control module 202 to select a DEVMODE based on the information in a job ticket received from the workflow application 200. Processing for selecting a DEVMODE will be described below. In the mapping table 503, a DevmodeData element 1000 and a DevmodeData element 1005 define the file names of the DEVMODEs 504 and 508, respectively. While, in the example illustrated in FIG. 10, only the DEVMODEs 504 and 508 are described, DEVMODEs 505, 506, 509, and 510 are also described in the case of the database illustrated in FIG. 5. A Rules element is defined as a child element of the DevmodeData elements 1000 and 1005. The Key attribute of a Rule element defines Xpath up to one print setting item in the job ticket. The Exist attribute defines in the BOOLEAN format whether the Rule element is applicable in the DEVMODE selection processing. For example, in the Key attribute 1001, Xpath up to the paper size 901 in the job ticket 900 illustrated in FIG. 9 is described. The Exist attribute 1002 set to TRUE means that the Key attribute 1001 is applied in the DEVMODE selection processing. On the other hand, the Exist attribute 1004 set to FALSE means that the Key attribute 1003 is not applied in the DEVMODE selection processing. More specifically, the Exist attribute indicates whether the Key attribute is taken into consideration when selecting a DEVMODE. When the Exist attribute is TRUE, the Key attribute is taken into consideration when selecting a DEVMODE. On the other hand, when the Exist attribute is FALSE, the Key attribute is not taken into consideration when selecting a DEVMODE. Although, in the example illustrated in FIG. 10, the Key attribute 1001 indicates the A4 paper size and the Key attribute 1003 indicates tape bookbinding, the DEVMODE 504 is selected when the job ticket specifies the A4 paper size. Although, in the example illustrated in FIG. 10, the Key attribute 1006 indicates the A4 paper size and the Key attribute 1008 indicates tape bookbinding, the DEVMODE 508 is selected when the job ticket specifies the A4 paper size and tape bookbinding.

Figure 11B:
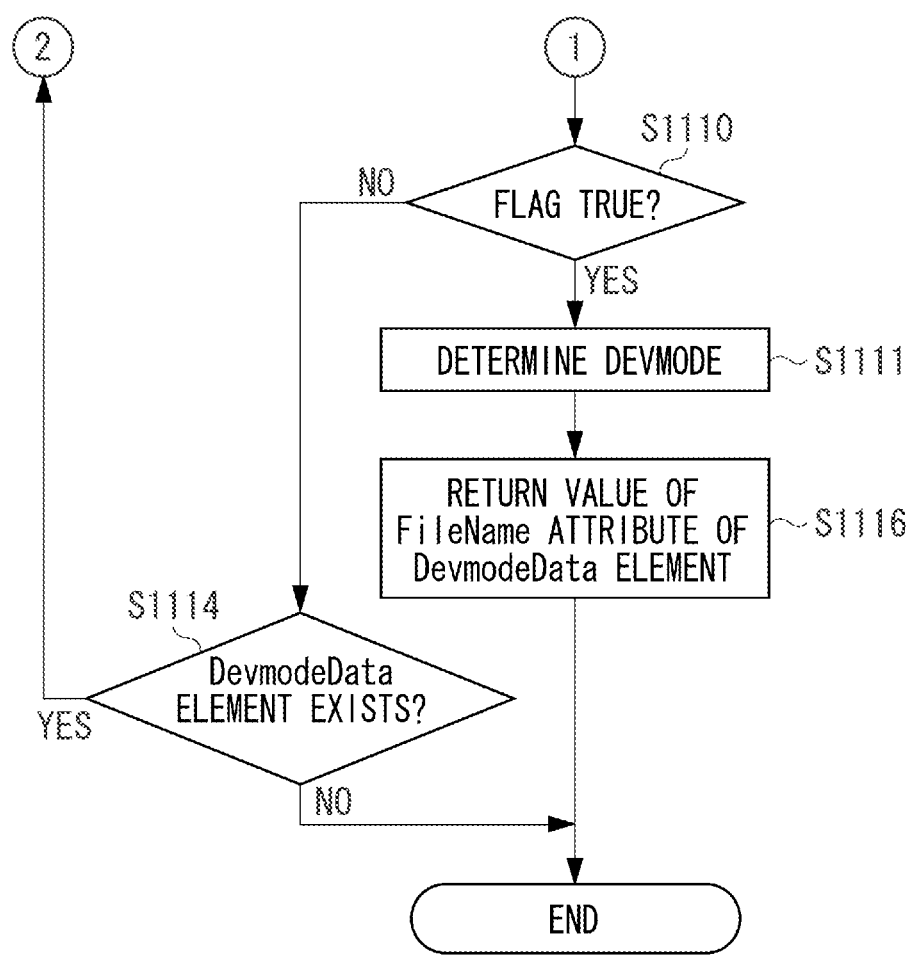

FIG. 11, which includes FIGS. 11A and 11B, is a flowchart illustrating a DEVMODE selection processing flow according to the present exemplary embodiment, i.e., detailed processing in step S1902 illustrated in FIG. 19. The DEVMODE selection processing flow illustrated in FIGS. 11A and 11B is mainly performed by the selection unit 402 illustrated in FIG. 4.

In step S1101, the selection unit 402 acquires a mapping table from the DEVMODE database 203 based on the identifier of the relevant image forming apparatus. For example, when the identifier of the image forming apparatus is "image forming apparatus 102", the selection unit 402 identifies the folder for the image forming apparatus 102 based on the identifier of the image forming apparatus and identifies the mapping table 503. When the identifier of the image forming apparatus corresponds to "image forming apparatus 103", the selection unit 402 identifies the folder for the image forming apparatus 103 based on the identifier of the image forming apparatus 103, and identifies the mapping table 503. According to the present exemplary embodiment, since the mapping table 503 is stored in two different locations, each folder is identified by using the identifier of each image forming apparatus. However, when storing only one mapping table in a specific location, it is not necessary to use the identifier of the image forming apparatus.

In step S1102, the selection unit 402 analyzes the mapping table 503 to acquire one DevmodeData element, for example, the DevmodeData element 1000. In step S1103, the selection unit 402 sets a flag within a program to TRUE. In step S1104, the selection unit 402 acquires one Rule element which is a grandchild element of the DevmodeData element previously acquired.

In step S1105, the selection unit 402 transfers Xpath described in the Key attribute of the Rule element to the acquisition unit 401 and then acquires from the acquisition unit 401 the number of items specified by the Xpath. For example, in the case of the job ticket 900, when the selection unit 402 transfers Xpath of the Key attribute 1001 to the acquisition unit 401, the Xpath corresponds to Dimension 901 and therefore "1" is returned as the number of items. When the selection unit 402 transfers Xpath of the Key attribute 1003 to the acquisition unit 401, SpineTapingParams does not exist in the job ticket 900 and therefore "0" is returned as the number of items. In the case of the job ticket 908, when the selection unit 402 transfers Xpath of the Key attribute 1003 to the acquisition unit 401, SpineTapingParams 914 exists in the job ticket 908 and therefore "1" is returned as the number of items.

In step S1106, the selection unit 402 determines whether the value of the Exist attribute of the Rule element is TRUE or FALSE. When the value is TRUE (YES in step S1106), the processing proceeds to step S1107. On the other hand, when the value is FALSE (NO in step S1106), the processing proceeds to step S1112. In step S1112, the selection unit 402 determines whether the number of items acquired in step S1105 is equal to or larger than zero. When the number of items is equal to or larger than zero (YES in step S1112), the processing proceeds to step S1108. On the other hand, when the number of items is smaller than zero (NO in step S1112), the processing proceeds to step S1110. In step S1107, the selection unit 402 determines whether the number of items acquired in step S1105 is zero. When the number of items is zero (YES in step S1107), the processing proceeds to step S1108. On the other hand, when the number of items is not zero (NO in step S1107), the processing proceeds to step S1109. In step S1108, the selection unit 402 sets the flag to FALSE. In step S1109, the selection unit 402 determines whether there is any unprocessed Rule element in the DevmodeData element. When there is an unprocessed Rule element (YES in step S1109), the processing proceeds to step S1113. Then in step S1113, the processing proceeds to the following Rule element. Then, the processing repeats steps S1104 to S1109. On the other hand, when there is no unprocessed Rule element (NO in step S1109), the processing proceeds to step S1110.

In step S1110, the selection unit 402 determines whether the flag is TRUE. When the flag is TRUE (YES in step S1110), the processing proceeds to step S111. Then in step S1111, the selection unit 402 determines a DEVMODE. In step S1116, the selection unit 402 transfers the value of the FileName attribute of the DevmodeData element to the printing control unit 400. Since this value of the FileName attribute is the file name of the DEVMODE stored in the DEVMODE database 203, the value will be used when acquiring a DEVMODE in processing to be described below. When the flag is FALSE (NO in step S1110), the processing proceeds to step S1114. Then in step S1114, the selection unit 402 determines whether the DevmodeData element exists in the mapping table 503. When there is no DevmodeData element (NO in step S1114), the DEVMODE selection processing ends. When there is a DevmodeData element (YES in step S1114), the processing proceeds to step S1115. Then in step S1115, the processing proceeds to the following DevmodeData element. Then, the processing repeats steps S1102 to S1111 or to S1115.

This completes the DEVMODE selection processing flow.

FIG. 12 is a flowchart illustrating a PDL generation processing flow according to the present exemplary embodiment, i.e., detailed processing in step S1903 illustrated in FIG. 19. The PDL generation processing flow illustrated in FIG. 12 is mainly performed by the generation unit 403 illustrated in FIG. 4.

In step S1200, the generation unit 403 acquires the identifier of an image forming apparatus and the file name of a DEVMODE from the printing control unit 400 to acquire the DEVMODE stored in the DEVMODE database 203. For example, upon acquisition of the identifier of the relevant image forming apparatus ("image forming apparatus 102") from the printing control unit 400, the generation unit 403 identifies the folder for the image forming apparatus 102 from among the DEVMODE database 203. The generation unit 403 further identifies the DEVMODE 504 to acquire the DEVMODE 504.

In step S1201, the generation unit 403 edits the public portion of the acquired DEVMODE 504. For example, when the DEVMODE 504 is selected, the generation unit 403 edits the public portion of the DEVMODE 504, including the paper size 800, the paper type 801, the one-sided/two-sided printing setting 802, and the number of copies 803. In the case of the job ticket 900, the value of the paper size 901 is A4 and therefore the generation unit 403 sets the paper size 800 to A4. For the one-sided/two-sided printing setting 905, one-sided printing is selected and therefore the generation unit 403 sets the one-sided/two-sided printing setting 802 to one-sided printing. The paper type 902 is Stationary and therefore the generation unit 403 sets the paper type 801 to Stationary. The number of copies 907 is 25000 and therefore the generation unit 403 sets the number of copies 803 to 25000. However, since the maximum value of the number of copies may be 9999 depending on the printer driver, the generation unit 403 edits the number of copies through the PDL editing processing flow (described below).

In step S1202, the generation unit 403 selects the printer driver 204 based on the identifier of the image forming apparatus ("image forming apparatus 102") and then sets the DEVMODE 504 for the printer driver 204. Thus, the print setting items of the printer driver 204 are updated by the values in the DEVMODE 504. When the identifier of the image forming apparatus is "image forming apparatus 103", the printer driver 204 is selected and therefore the DEVMODE 504 is set for the printer driver 204. In step S1203, the generation unit 403 acquires the Uniform Resource Locator (URL) of a PDF storage location from the job ticket. More specifically, in the case of the job ticket 900, the generation unit 403 acquires the value of the FileSpec/@URL attribute 906 ("../TEST.pdf"). In step S1204, the generation unit 403 acquires a PDF based on the URL of the PDF storage location acquired in step S1203. In step S1205, the generation unit 403 specifies a PDL storage destination for the printer driver 204 and then issues a print instruction to the printer driver 204 to generate a PDL.

According to the present exemplary embodiment, the generation unit 403 acquires a PDF based on the URL of the PDF storage location. However, the acquisition unit 401 may acquire a PDF without using the URL and use the acquired PDF. FIG. 13 illustrates examples of parts of PDLs according to the present exemplary embodiment. Referring to FIG. 13, a PDL 1300 and a PDL 1305 are PDLs generated by the generation unit 403 through the PDL generation processing flow. Although, in the present exemplary embodiment, PostScript of Adobe is used as an example of a PDL, a PDL originally developed by each printer maker may be used. The PDL formats do not restrict the present invention.

The PDL 1300 is a PDL generated after the DEVMODE 504 is set for the printer driver 204. The PDL 1300 contains a resource portion which includes the number of copies 1301, a one-sided/two-sided printing setting 1302, a paper grammage 1303, and a paper color 1304. The resource portion serves as a command for specifying these setting items for an image forming apparatus.

The PDL 1305 is a PDL generated after the DEVMODE 508 has been set to the printer driver 205. The PDL 1305 contains a custom job ticket 1306 and a resource portion including setting items 1312 to 1315. The resource portion includes the number of copies 1312, a one-sided/two-sided printing setting 1313, a paper grammage 1314, and a paper color 1315. The resource portion serves as a command to designate these setting items for an image forming apparatus. However, in a PDL of this format, the command of the resource portion is ignored and print setting items described in the custom job ticket 1306 become effective in the relevant image forming apparatus. The custom job ticket 1306 includes the number of copies 1307, a paper color 1308, a paper grammage 1309, a bookbinding setting 1310, a one-sided/two-sided printing setting 1311, and a job name 1316.

Figure 14B:
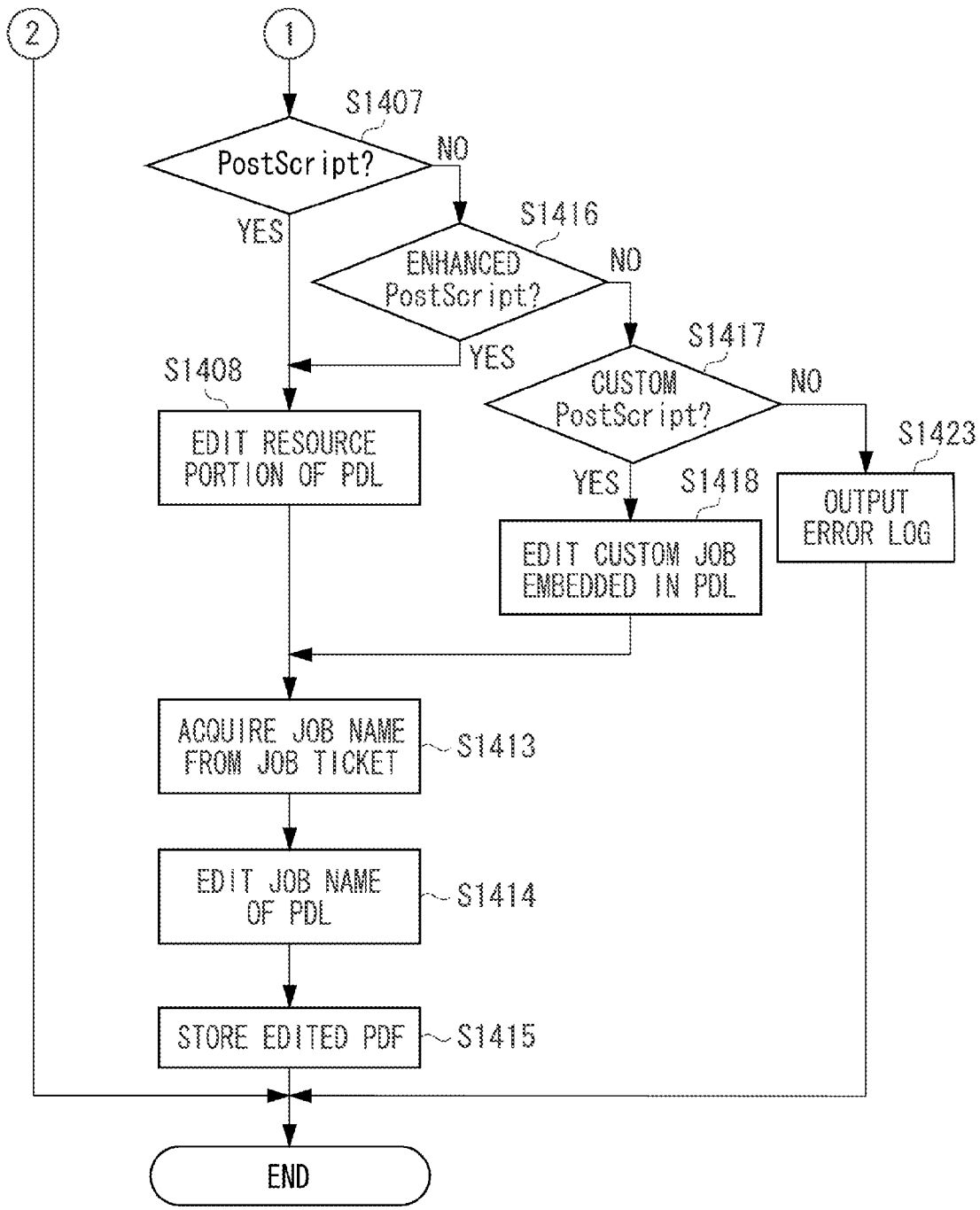

FIG. 14, which includes FIGS. 14A and 14B, is a flowchart illustrating a PDL editing processing flow according to the present exemplary embodiment, i.e., detailed processing in step S1904 illustrated in FIG. 19. The PDL editing processing flow illustrated in FIGS. 14A and 14B is mainly performed by the editing unit 404 illustrated in FIG. 4.

In step S1400, the editing unit 404 periodically monitors whether an editing target PDL has been generated by the generation unit 403. When an editing target PDL exists (YES in step S1400), the processing proceeds to step S1401. On the other hand, when an editing target PDL does not exist (NO in step S1400), the PDL editing processing flow ends.

In step S1401, the editing unit 404 determines whether a job ticket includes any setting item corresponding to the private portion. When the job ticket is determined to include a setting item corresponding to the private portion (YES in step S1401), the processing proceeds to step S1402. Then in step S1402, the editing unit 404 acquires the setting items corresponding to the private portion from the job ticket. As an example, the editing unit 404 acquires a paper color and a paper grammage from the job ticket. For example, in the case of the job ticket 900, the editing unit 404 acquires a paper color from the MediaColorName attribute 903 and acquires a paper grammage from Weight 904.

In step S1403, the editing unit 404 determines whether the generated PDL includes any setting item having a different setting from the job ticket. There may be a setting item having a different setting from the job ticket because setting of printer drivers is limited. For example, in a case where 25000 is described as the number of copies in the job ticket and where the number of copies exceeding 9999 cannot be specified for a printer driver, a PDL cannot be generated with the number of copies set to 25000 by using the printer driver.

When the generated PDL is determined to include any setting item having a different setting from the job ticket (YES in step S1403), the processing proceeds to step S1404. Then in step S1404, the editing unit 404 acquires setting items having a different setting from the job ticket. For example, in the case of the job ticket 900, the editing unit 404 acquires the value of the number of copies from the number of copies 907.

In step S1406, the editing unit 404 determines the type of the editing target PDL because the editing target portion differs according to the PDL type. When the result of the PDL type determination in step S1406 is PostScript (YES in step S1407), the processing proceeds to step S1408. On the other hand, when the result of the PDL type determination is not PostScript (NO in step S1407), the processing proceeds to step S1416. When the result of the PDL type determination in step S1406 is Enhanced PostScript (YES in step S1416), the processing proceeds to step S1408. On the other hand, when the result of the PDL type determination is not Enhanced PostScript (NO in step S1416), the processing proceeds to step S1417. When the result of the PDL type determination is Custom PostScript in which a custom job ticket is embedded (YES in step S1417), the processing proceeds to step S1418. On the other hand, when the result of the PDL type determination is not Custom PostScript (NO in step S1417), the editing unit 404 determines that the relevant PDL is an uneditable PDL, and the processing proceeds to step S1423. In step S1423, the editing unit 404 outputs an error log, and the PDL editing processing flow ends.

For example, in the case of the PDL 1300 illustrated in FIG. 13, the result of the PDL type determination is PostScript (YES in step S1407), and the processing proceeds to step S1408. In the case of the PDL 1305 illustrated in FIG. 13, the result of the PDL type determination is Custom PostScript (YES in step S1417), and the processing proceeds to step S1418.

In step S1408, the editing unit 404 reads the resource portion of the PDL and then edits the read resource portion by using the information acquired from the job ticket. For example, when setting items corresponding to the private portion include the paper color and the paper grammage, and a setting item having a different setting from the job ticket is the number of copies, the editing unit 404 edits the paper color, the paper grammage, and the number of copies. More specifically, when the paper color 903 in the job ticket 900 is Yellow, the editing unit 404 updates the value of the paper color 1304 from "White" to "Yellow." When the paper grammage 904 in the job ticket 900 is 64, the editing unit 404 updates the value of the paper grammage 1303 from "80" to "64." When the number of copies 907 in the job ticket 900 is 25000, the editing unit 404 updates the value of the number of copies 1301 from "1" to "25000."

In step S1413, the editing unit 404 acquires the job name from the job ticket. For example, in the case of the job ticket 900, the editing unit 404 acquires the value "Sample1" of the JDF/@DescriptiveName attribute. In the case of the job ticket 908, the editing unit 404 acquires the value "Sample2" of the JDF/@DescriptiveName attribute.

In step S1414, the editing unit 404 sets the acquired job name in the editing target PDL. For example, in the case of the PostScript format of Adobe such as the PDL 1300, since the file name is handled as a job name, the file name of the PDL is the job name acquired in step S1413. In a case where the job name 1316 is prepared in the custom job ticket such as the PDL 1305, the editing unit 404 sets the job name acquired in step S1413 to the job name 1316. In step S1415, the editing unit 404 stores the edited PDL as a file. When the result of the PDL type determination is Custom PostScript (YES in step S1417), the processing proceeds to step S1418. Then in step S1418, the editing unit 404 acquires the custom job ticket portion of the PDL and then edits the acquired custom job ticket portion by using the information acquired from the job ticket. For example, when setting items corresponding to the private portion include the paper color and the paper grammage and there is no setting item having a different setting from the job ticket, the editing unit 404 edits the paper color and the paper grammage.

According to the present exemplary embodiment, while PDLs of the PostScript and Custom PostScript types are edited, the PDL type does not restrict the present invention.

Figure 15:
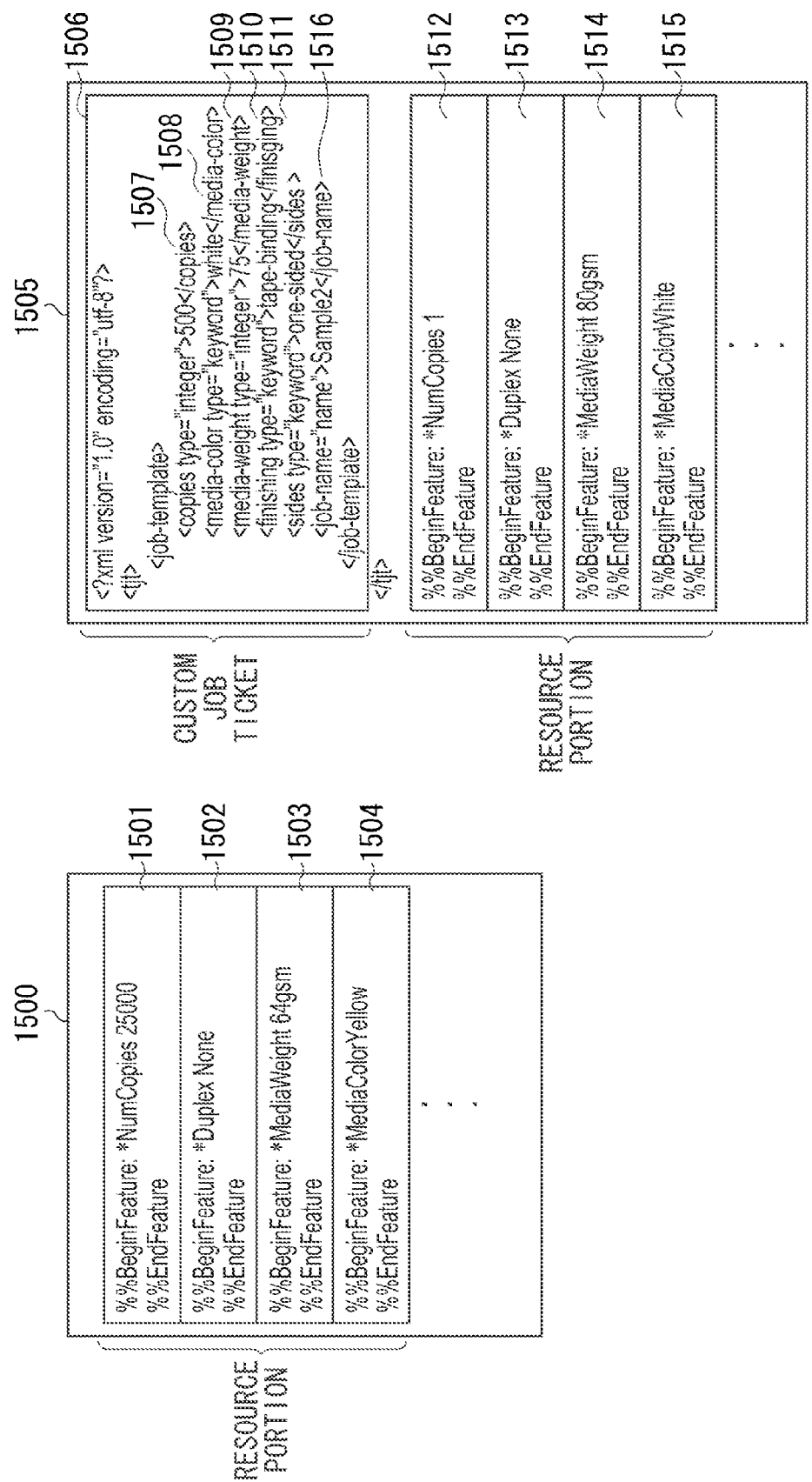
FIG. 15 illustrates examples of edited PDLs according to the present exemplary embodiment.

FIG. 15 illustrates examples of parts of edited PDLs according to the present exemplary embodiment. Referring to FIG. 15, a PDL 1500 includes the data of the PDL 1300 illustrated in FIG. 13 after being edited by the editing unit 404, and a PDL 1505 includes the data of the PDL 1305 illustrated in FIG. 13 after being edited by the editing unit 404. In the PDL 1300, the number of copies 1301, the paper grammage 1303, and the paper color 1304 have been edited. Therefore, in the PDL 1500, the number of copies 1501, the paper grammage 1503, and the paper color 1504 are edited by the editing unit 404. In the PDL 1305, the paper grammage 1309 has been edited. Therefore, in the PDL 1505, the paper grammage 1509 is edited by the editing unit 404.

Figure 16:
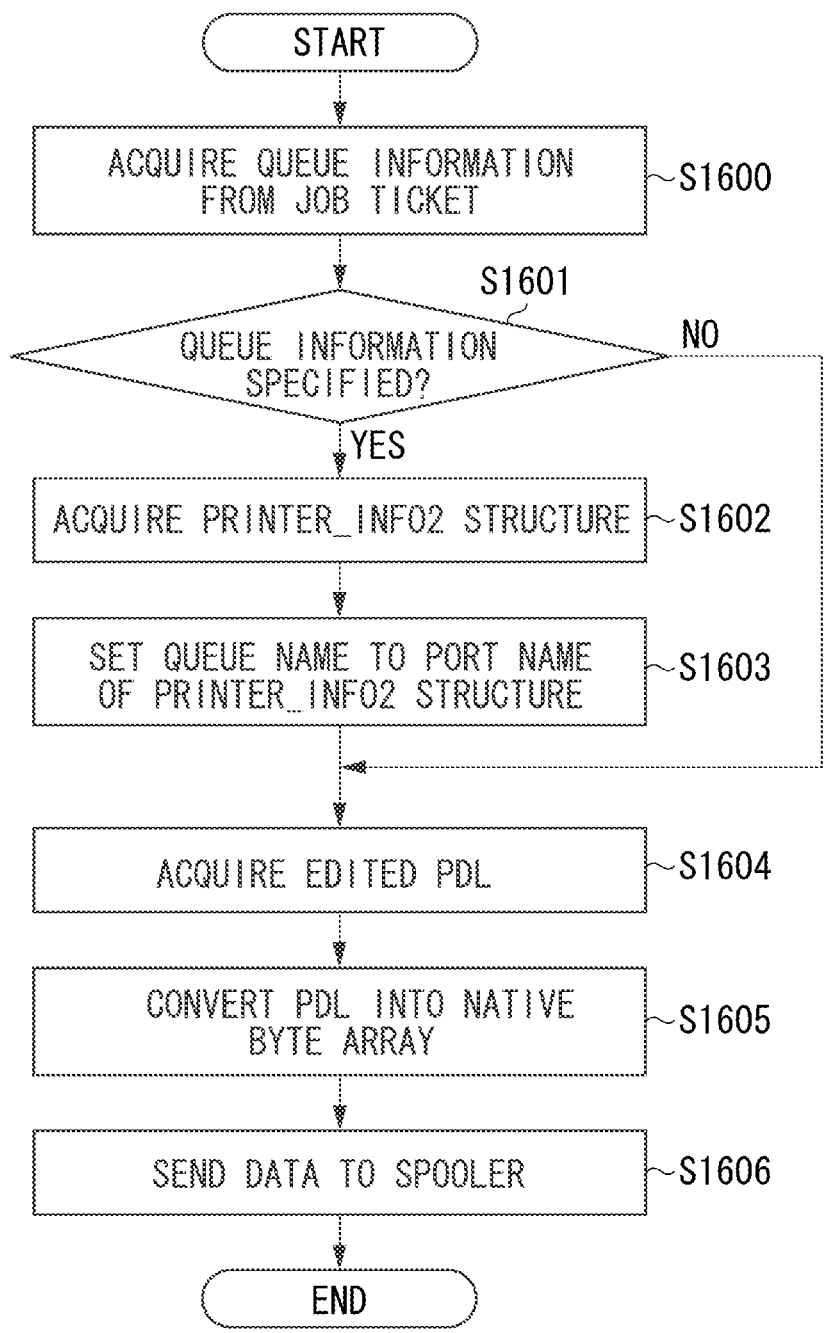
FIG. 16 is a flowchart illustrating a PDL transmission flow according to the present exemplary embodiment.

FIG. 16 is a flowchart illustrating a PDL transmission flow according to the present exemplary embodiment, i.e., detailed processing in step S1905 illustrated in FIG. 19. The PDL transmission flow illustrated in FIG. 16 is mainly performed by the transmission unit 405.

Figure 17:
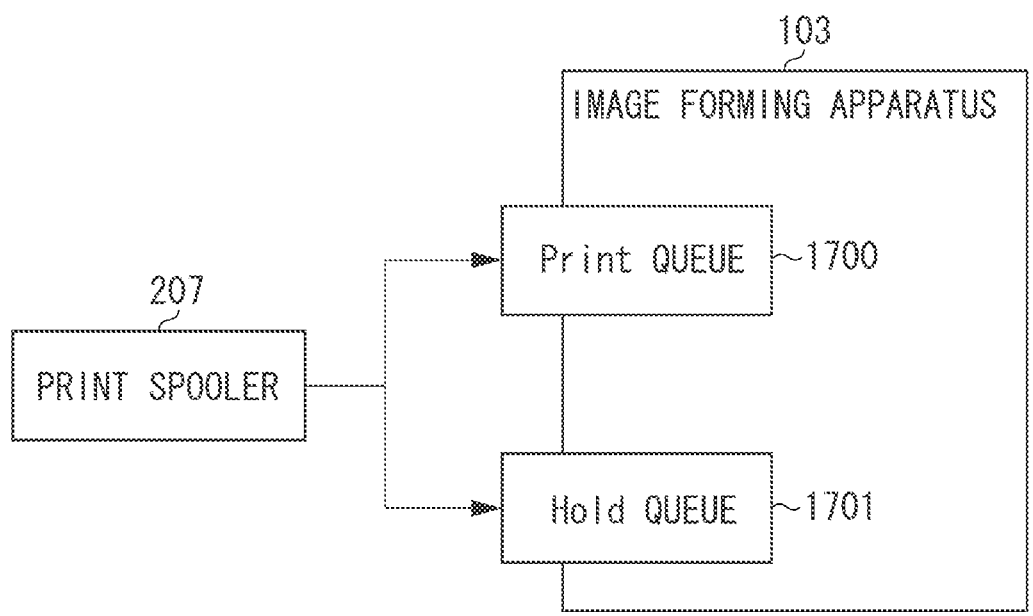
FIG. 17 illustrates an example of a queue configuration of an image forming apparatus according to the present exemplary embodiment.

In step S1600, the transmission unit 405 acquires queue information from a job ticket. As is the case with the image forming apparatus 103 illustrated in FIG. 17, a print spooler 207 can specify a transmission destination queue and transmit a print job to the image forming apparatus 103. According to the present exemplary embodiment, a queue refers to a print queue generated and managed within the image forming apparatus. For example, upon reception of a print job, the image forming apparatus 103 uses a Print queue 1700 to immediately start printing the received print job without reserving the print job. In contrast, upon reception of a print job, the image forming apparatus 103 uses a Hold queue to once reserve the received print job. For example, in the case of the job ticket 900, the transmission unit 405 acquires a null character as queue information since queue information is not included. In the case of the job ticket 908, the transmission unit 405 acquires queue information 915.

The queue information 915 describes an instruction for transmitting the print job to the HOLD queue.

Figure 18:
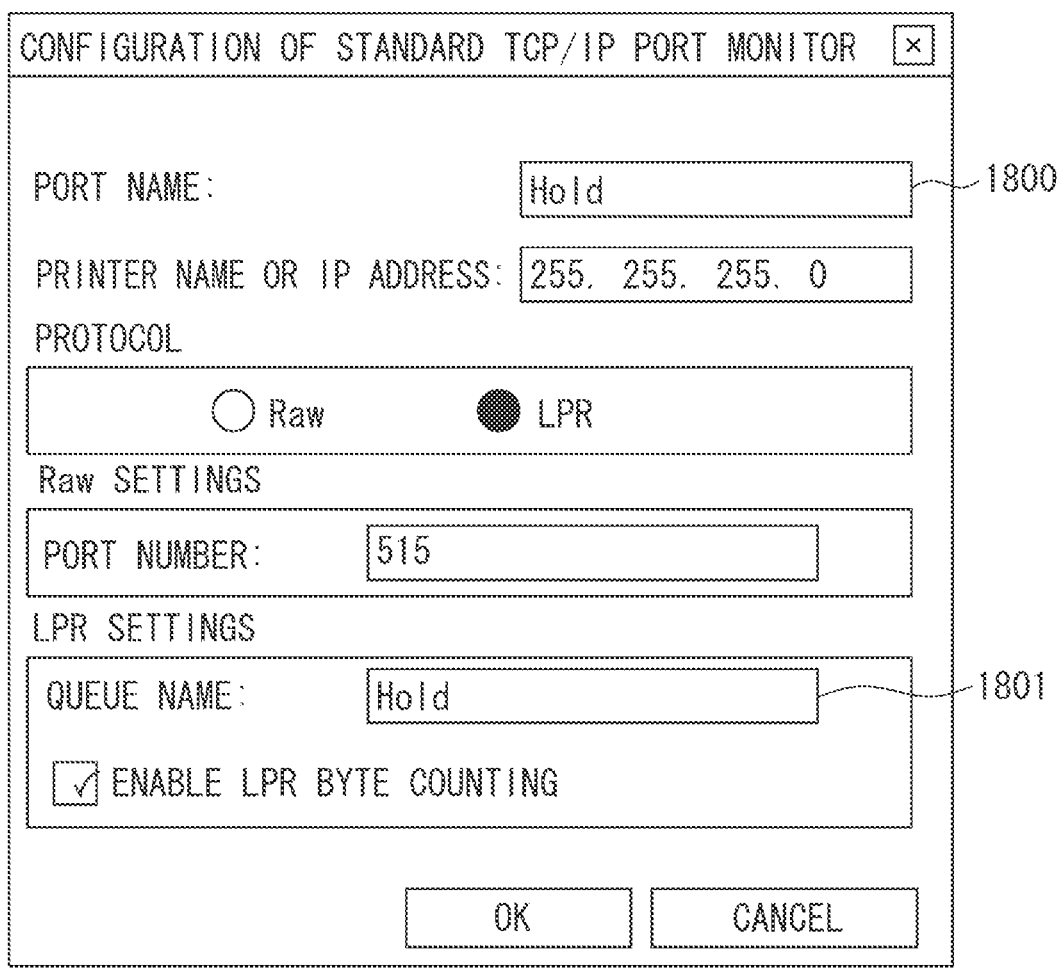
FIG. 18 illustrates an example of a port configuration of a printer driver according to the present exemplary embodiment.

In step S1601, the transmission unit 405 determines whether queue information has been acquired in step S1600. When queue information has been acquired (YES in step S1601), the processing proceeds to step S1602. On the other hand, when queue information has not been acquired (NO in step S1601), the processing proceeds to step S1604. In step S1602, the transmission unit 405 acquires the PRINTER_INFO2 structure of the print spooler 207 based on the identifier of the image forming apparatus. For example, the transmission unit 405 identifies the print spooler 207 and acquires the PRINTER_INFO2 structure based on the identifier of the image forming apparatus ("image forming apparatus 103"). In step S1603, the transmission unit 405 sets the queue name described in the queue information to the port name of the PRINTER_INFO2 structure. According to the present exemplary embodiment, a port name 1800 coincides with a queue name 1801 as illustrated in FIG. 18. Therefore, the queue can be altered by changing the port name of the PRINTER_INFO2 structure. In step S1604, the transmission unit 405 acquires a PDL edited and stored by the editing unit 404. In step S1605, the transmission unit 405 converts the PDL into a native byte array. In step S1606, the transmission unit 405 transmits the data of the byte array converted in step S1605 to the print spooler specified based on the identifier of the image forming apparatus. The print spooler transmits the data of the byte array to the image forming apparatus. When a queue is specified, the transmission unit 405 transmits the data of the byte array to the specified queue of the image forming apparatus.

According to the present exemplary embodiment, print setting items limited by the printer driver (for example, the number of copies) and setting items of the private portion (for example, the paper grammage and the paper color) are edited through the PDL editing processing flow. Therefore, editing afterwards setting items limited by the printer driver and setting items of the private portion enable transmitting a PDL corresponding to the job ticket. In addition, although items of the public portion can also be edited afterwards, for example, with respect to an orientation (in the vertical and horizontal directions), these items cannot be applied only by changing their values afterwards. Therefore, it is desirable to reflect the setting items of the public portion before generating a PDL.

According to the present exemplary embodiment, print setting items (including the private portion) frequently used in a routine printing task as in the case of in-house printing are stored as a DEVMODE, and the DEVMODE is set in the relevant printer driver at the time of printing execution. Therefore, a complicated print instruction including a bookbinding setting and a folding setting can be issued also to other companies' image forming apparatuses. As a result, it is also possible to issue a print instruction from one workflow application to image forming apparatuses made by a plurality of vendors. Thus, according to the present exemplar embodiment, it is unnecessary for a worker on a production site to use different workflow applications, improving the worker's production efficiency. Further, the present exemplary embodiment enables a vendor providing a workflow application to support other companies' image forming apparatuses only by preparing a DEVMODE.

According to the present exemplary embodiment, the number of DEVMODEs to be prepared can be reduced by editing the public portion of each DEVMODE and editing a PDL. Therefore, it is possible to reduce the burden on a system installation worker and increase the speed of processing for selecting a suitable DEVMODE.

According to the above-described exemplary embodiments, it is possible to efficiently issue a print instruction to image forming apparatuses whose job ticket specifications are not disclosed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-160673, filed Aug. 6, 2014, which is hereby incorporated by reference herein in its entirety.

What is claimed is:

1. An information processing apparatus comprising:
a storage unit configured to store a plurality of settings of a printer driver, wherein the settings of the printer driver include a public portion, specifications of which are disclosed, and a private portion, specifications of which are not disclosed; and
at least one processor configured to operate to:
acquire a job ticket in which print settings are described;
select, based on the print settings described in the job ticket, one setting of the printer driver from the plurality of settings of the printer driver;
cause a print setting corresponding to the public portion of the settings of the printer driver out of the print settings described in the job ticket to be reflected on a print item of the public portion of the selected settings of the printer driver;
generate a PDL by using the printer driver and based on the setting on which the print setting has been reflected;
determine whether or not a print setting corresponding to the private portion of the settings of the printer driver is included in the print settings described in the job ticket;

determine whether or not an item having a different setting from the job ticket is included in the generated PDL;

in a case where it has been determined that the print settings described in the job ticket include a print setting corresponding to the private portion of the settings of the printer driver and in a case where it has been determined that the generated PDL includes an item having a different setting from the job ticket, edit print settings of the generated PDL, based on the print settings described in the job ticket; and transmit the edited PDL to an image forming apparatus, wherein, in the case where it has been determined that the print settings described in the job ticket includes a print setting corresponding to the private portion of the settings of the printer driver, the print settings of the generated PDL is edited based on the print setting corresponding to the private portion of the settings of the printer driver out of the print settings described in the job ticket.

2. The information processing apparatus according to claim 1, wherein the storage unit stores a DEVMODE that stores settings of a printer driver.

3. A method for controlling an informing processing apparatus, the method comprising:

acquiring a job ticket in which print settings are described;

selecting, based on the print settings described in the job ticket, one setting of a printer driver from a plurality of settings of the printer driver, wherein the settings of the printer driver include a public portion, specifications of which are disclosed, and a private portion, specifications of which are not disclosed;

causing a print setting corresponding to the public portion of settings of the printer driver out of the print settings described in the job ticket to be reflected on a print item of the public portion of the selected settings of the printer driver;

generating a PDL by using the printer driver and based on the setting on which the print setting has been reflected;

determining whether or not a print setting corresponding to the private portion of the settings of the printer driver is included in the print settings described in the job ticket;

determine whether or not an item having a different setting from the job ticket is included in the generated PDL;

in a case where it has been determined that the print settings described in the job ticket include a print setting corresponding to the private portion of the settings of the printer driver and in a case where it has been determined that the generated PDL includes an item having a different setting from the job ticket, editing print settings of the generated PDL, based on the print settings described in the job ticket; and transmitting the edited PDL to an image forming apparatus, wherein, in the case where it has been determined that the print settings described in the job ticket includes a print setting corresponding to the private portion of the settings of the printer driver, the print settings of the generated PDL is edited based on the print setting corresponding to the private portion of the settings of the printer driver out of the print settings described in the job ticket.

4. The method for controlling an information processing apparatus according to claim 3, wherein the storage portion stores a DEVMODE that stores settings of a printer driver.

5. A non-transitory computer-readable medium storing instructions that, when executed by a computer, cause the computer to function as an information processing apparatus, the information processing apparatus comprising:

a storage unit configured to store a plurality of settings of a printer driver, wherein the settings of the printer driver include a public portion, specifications of which are disclosed, and a private portion, specifications of which are not disclosed; and at least one processor is configured to operate to:

acquire a job ticket in which print settings are described;

select, based on the print settings described in the job ticket, one setting of the printer driver from the plurality of settings of the printer driver;

cause a print setting corresponding to the public portion of the settings of the printer driver out of the print settings described in the job ticket to be reflected on a print item of the public portion of the selected settings of the printer driver;

generate a PDL by using the printer driver and based on the setting on which the print setting has been reflected;

determine whether or not a print setting corresponding to the private portion of the settings of the printer driver is included in the print settings described in the job ticket;

determine whether or not an item having a different setting from the job ticket is included in the generated PDL;

in a case where it has been determined that the print settings described in the job ticket include a print setting corresponding to the private portion of the settings of the printer driver and in a case where it has been determined that the generated PDL includes an item having a different setting from the job ticket, edit print settings of the generated PDL, based on the print settings described in the job ticket; and transmit the edited PDL to an image forming apparatus, wherein, in the case where it has been determined that the print settings described in the job ticket includes a print setting corresponding to the private portion of the settings of the printer driver, the print settings of the generated PDL is edited based on the print setting corresponding to the private portion of the settings of the printer driver out of the print settings described in the job ticket.

* * * * *